US011912927B2

(12) United States Patent
Pyatina et al.

(10) Patent No.: US 11,912,927 B2
(45) Date of Patent: Feb. 27, 2024

(54) SUPER-HYDROPHOBIC, THERMALLY INSULATING, THERMAL-SHOCKS RESISTANT WELL CEMENT COMPOSITES FOR COMPLETION OF GEOTHERMAL WELLS AT HYDROTHERMAL TEMPERATURES OF UP TO 300° C

(71) Applicant: Brookhaven Science Associates, LLC, Upton, NY (US)

(72) Inventors: Tatiana Pyatina, Stony Brook, NY (US); Toshifumi Sugama, Wading River, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 93 days.

(21) Appl. No.: 17/494,477

(22) Filed: Oct. 5, 2021

(65) Prior Publication Data
US 2022/0106516 A1 Apr. 7, 2022

Related U.S. Application Data

(60) Provisional application No. 63/087,489, filed on Oct. 5, 2020.

(51) Int. Cl.
*C04B 20/10* (2006.01)
*C04B 24/42* (2006.01)
(Continued)

(52) U.S. Cl.
CPC ............ *C09K 8/467* (2013.01); *C04B 18/082* (2013.01); *C04B 20/1037* (2013.01);
(Continued)

(58) Field of Classification Search
CPC ... C09K 8/467; C04B 18/082; C04B 20/1037; C04B 20/1051; C04B 24/42;
(Continued)

(56) References Cited

U.S. PATENT DOCUMENTS

2002/0050231 A1 5/2002 Brothers et al.
2003/0066460 A1 4/2003 Reddy et al.
(Continued)

FOREIGN PATENT DOCUMENTS

CN 105018056 A 11/2015
CN 106190069 A 12/2016
(Continued)

OTHER PUBLICATIONS

Pyatina, T et al., "Self-Repairing Geothermal Well Cement Composites," GRC Transactions, vol. 40, pp. 235-244 (2016) (Year: 2016).*
(Continued)

*Primary Examiner* — Anthony J Green
*Assistant Examiner* — Marites A Guino-O Uzzle
(74) *Attorney, Agent, or Firm* — Dorene Price

(57) ABSTRACT

A well cement composite and a method for making a well cement composite includes a mixture of calcium aluminate cement (CAC) and fly ash cenospheres (CS) in a weight ratio of from 30:70 to 80:20 CAC to CS; sodium metasilicate (SMS) in an amount of from 1 to 10% of the total weight of the mixture of CAC and CS; polymethylhydrosiloxane (PMHS) in an amount of from 0.5 to 6.0% of the total weight of the mixture of CAC and CS; and water in a weight ratio of from 0.5:1.0 to 1.2:1.0 of water to CAC and CS.

20 Claims, 5 Drawing Sheets
(5 of 5 Drawing Sheet(s) Filed in Color)

(51) Int. Cl.
    *C04B 28/26*     (2006.01)
    *C04B 40/00*     (2006.01)
    *C09K 8/467*     (2006.01)
    *C04B 28/06*     (2006.01)
    *C04B 18/08*     (2006.01)
    *C04B 111/20*    (2006.01)
    *C04B 111/27*    (2006.01)

(52) U.S. Cl.
    CPC .......... *C04B 20/1051* (2013.01); *C04B 24/42* (2013.01); *C04B 28/06* (2013.01); *C04B 28/26* (2013.01); *C04B 40/0042* (2013.01); *C04B 2111/2084* (2013.01); *C04B 2111/27* (2013.01); *C04B 2201/20* (2013.01); *C04B 2201/32* (2013.01)

(58) Field of Classification Search
    CPC ..... C04B 28/06; C04B 28/26; C04B 40/0042; C04B 2111/2084; C04B 2111/27; C04B 2201/20; C04B 2201/32; C04B 20/10; C04B 40/00; C04B 12/04; C04B 7/32
    See application file for complete search history.

(56) References Cited

U.S. PATENT DOCUMENTS

| | | | |
|---|---|---|---|
| 2006/0201672 | A1 | 9/2006 | Kulakofsky et al. |
| 2008/0066655 | A1 | 3/2008 | Fraser |
| 2017/0081496 | A1 | 3/2017 | Chuang |
| 2018/0127517 | A1 | 5/2018 | Luo et al. |

FOREIGN PATENT DOCUMENTS

| | | |
|---|---|---|
| CN | 106904910 A | 6/2017 |
| CN | 108821616 A | 11/2018 |
| CN | 111116113 A | 1/2020 |

OTHER PUBLICATIONS

Hanif, A et al., "Utilization of fly ash cenospheres as lightweight filler in cement-based composites—A review", Construction and Building Materials, vol. 144, pp. 373-384 (2017) (Year: 2017).*

Sugama, T et al., "Acid-resistant polydimethylsiloxane additive for geothermal well cement in 150° C. H2SO4 solution", Advances in Cement Research 2003 15:1, 35-44. DOI:10.1680/adcr.2003.15.1.35 (Year: 2003).*

Chepaitis, P. S., "A Novel Coal Fly Ash Sphere Reveals a Complete Understanding of Plerosphere Formation," The Microscope, vol. 59:4, pp. 175-180 (2011).

Zhijun Feng, Z., "Integral hydrophobic concrete without using silane," Construction and Building Materials, vol. 227, 116678, pp. 1-10 (2019).

Hanifa, A., "Utilization of fly ash cenosphere as lightweight filler in cement-based composites—A review," Construction and Building Materials, vol. 144, pp. 373-384 (2017).

Kelly, A. A., "Oil is on the agenda: Lipid turnover in higher plants," Biochimica et Biophysica Acta, vol. 1861, pp. 1253-1268 (2016).

Dong, B., "Simple Fabrication of Concrete with Remarkable Self-Cleaning Ability, Robust Superhydrophobicity, Tailored Porosity, and Highly Thermal and Sound Insulation," ACS Appl. Mater. Interfaces, 11, 42801-42807 (2019).

Fernandez, R., "The origin of the pozzolanic activity of calcined clay minerals: A comparison between kaolinite, illite and montmorillonite," Cement and Concrete Research, vol. 41, pp. 113-122 (2011).

Mertens, G., "Pozzolanic reactions of common natural zeolites with lime and parameters affecting their reactivity," Cement and Concrete Research, vol. 39, pp. 233-240 (2009).

Pang, B., "5S Multifunctional Intelligent Coating with Superdurable, Superhydrophobic, Self-Monitoring, Self-Heating, and Self-Healing Properties for Existing Construction Application," ACS Appl. Mater. Interfaces, vol. 11, pp. 29242-29254 (2019).

Pang, B., "Interface Properties of Nanosilica-Modified Waterborne Epoxy Cement Repairing System," ACS Appl. Mater. Interfaces, vol. 10, pp. 21696-21711 (2018).

Pyatina, T., "Acid resistance of calcium aluminate cement-fly ash F blends," Advances in Cement Research, vol. 28 (7), pp. 433-457 (2016).

Pyatina, P., "Cements with supplementary cementitious materials for high-temperature geothermal wells," Geothermics, vol. 86, 101840, pp. 1-22 (2020).

Pyatina, T., "Self-Repairing Geothermal Well Cement Composites," GRC Transactions, vol. 40, pp. 235-244 (2016).

Smith, J. C. B., "Analysis of Organo-silicon Compounds, with Special Reference to Silanes and Siloxanes, A review," The Analyst, vol. 85 (1012), pp. 465-474(1960).

Sugama, T., "Corrosion-Resistant Foamed Cements for Carbon Steels in Enhanced Geothermal Systems," GRC Transactions, vol. 37, pp. 101-108 (2013).

Sugama, T., "Self-healing, re-adhering, and carbon-steel corrosion mitigating properties of fly ash-containing calcium aluminum phosphate cement composite at 300° C. hydrothermal temperature," Cement and Concrete Composites, vol. 99, pp. 1-16 (2019).

Urhan, S., "Alkali Silica and Pozzolanic Reactions in Concrete. Part 1 : Interpretation of Published Results and an Hypothesis Concerning the Mechanism," Cement and Concrete Research, vol. 17, pp. 141-152 (1987).

Yu, H., "Numerical simulation of CO2 circulating in a retrofitted geothermal well," Journal of Petroleum Science and Engineering, vol. 172, pp. 217-227 (2019).

Wang, K.-S., "The thermal conductivity mechanism of sewage sludge ash lightweight materials," Cement and Concrete Research, vol. 35, pp. 803-809 (2005).

Won, J., "Numerical Investigation on the Effect of Cementing Properties on the Thermal and Mechanical Stability of Geothermal Wells," Energies, vol. 9, 1016, pp. 1-13 (2016).

Nelson, E. B., & Barlet-Gouedard, V. (2006). Thermal Cements in E B Nelson & D Guillot (Eds.), Well Cementing (2nd ed., pp. 319-341) Sugar Land. Schlumberger.

* cited by examiner

SUPER-HYDROPHOBIC, THERMALLY INSULATING, THERMAL-SHOCKS RESISTANT WELL CEMENT COMPOSITES FOR COMPLETION OF GEOTHERMAL WELLS AT HYDROTHERMAL TEMPERATURES OF UP TO 300° C

The present application claims priority from U.S. provisional patent application 63/087,489, filed on Oct. 5, 2020, and incorporated herein in its entirety by reference.

The present patent application was made with government support under contract number DE-SC0012704 awarded by the U.S. Department of Energy. The United States government has certain rights in the invention(s).

FIELD OF THE INVENTION

The present invention is a super-hydrophobic, thermally insulating, thermal-shocks resistant well cement that is used to fill the annular space between a tubular body and the wellbore to protect the well casing from long term exposure to geothermal fluids and temperatures.

BACKGROUND OF INVENTION

During the construction of subterranean wells, it is common, to place a tubular body (drill pipe, casing, liner, coiled tubing, or their combinations) in the wellbore. The tubular body serves as a conduit for the travel of desirable fluids. The tubular body is secured in the well by a cement sheath, which provides mechanical support, corrosion protection and hydraulic isolation between the zones or layers that the well penetrates (zonal isolation). The latter function is important in all wells because it prevents hydraulic communication between the zones that may result in contamination (for example polluting fluids from other zones entering the water table zone and contaminating drinking water). The functions of mechanical support and tubular body corrosion protection are very important in geothermal wells that experience high temperature variations (causing the tubular body to buckle and break) and generally have very corrosive environments containing hypersaline brine, $CO_2$, and $H_2S$ at high temperatures (causing fast tubular corrosion). The cement sheath achieves its hydraulic isolation because of its low permeability and an intimate bonding with the tubular body and borehole, which prevents leaks. An additional, important function of the cement sheath in geothermal wells is prevention of the heat loss of the carrier fluid heated at high underground temperatures and recovered through a production well. A proper thermal insulation of cool upper portions of a deep production well may significantly improve economics of heat recovery of a well.

To be economical, underground heat recovery geothermal wells are usually built in highly permeable fractured or poorly consolidated formations. Under such conditions, lost-circulation problems can occur when cement slurry is partially or completely lost to the formation. This problem is very common and results in significant cost increases for geothermal well constructions. To minimize fractures in the formation and the leaking of the cement into the fractures, lightweight (low density) cement slurries that exhibit lower pressure on underground formations are commonly used for geothermal well cementing. In addition to the reduction of lost-circulation problems, these low density cement slurries result in more ductile cements with lower Young's Modulus, which better withstand repeated compressive and tensile stresses experienced by the cement sheath in geothermal wells. During the hot fluid production or cold water injection through the cemented tubular body, the low density cements control radial displacement of the cement sheath at the interfacial cement-tubular body bond. Since the low-density slurries are prepared either by foaming the slurries with a gas (air or nitrogen) or by incorporating into the slurries low-weight hollow particles, they not only alleviate lost-circulation problems and improve cement ductility but also improve thermal insulating properties of cements. However, significant thermal conductivity comes from the water mixed with dry cement to prepare the cement slurries and remains in the cement matrix as free water or as part of cement hydrates after the cement hardens. The thermal conductivity of materials present in geothermal wells decreases in the following order: Steel casing (about 58 Watt per meter by Kelvin (W/mK))»rock formation (~1.8 W/mK) >cement sheath (~0.93 W/mK)>free water (~0.61 W/mK) »air (~0.026 W/mK), $CO_2$ (gas) (~0.015 W/mK) and $N_2$ (gas) (~0.024 W/mK). The gases possess very low conductivity, which is more than 20 times lower than water conductivity, while conductivity of the rock formation is typically 2 to 3 times higher than that of water or cement. However, water intercalated in cement hydrate compounds that remains present in hydrated set cement is 50% more thermally conductive than free water. Thus, the thermally insulating cement must include high fractions of gas and low fractions of free and hydrated water in its structure.

Currently, most geothermal wells are cemented with Ordinary Portland Cement (OPC)-based formulations. These formulations are not thermal-shock resistant and are susceptible to degradation under acid attacks. Efforts to resolve the issues of OPC-based cements durability under various stresses focused on modification of OPC-based slurries with organic additives developed for applications in oil-and-gas wells. Such modifications allow an improvement of the bond strength, acidic corrosion resistance and cement sheath durability under low-temperature conditions (below ~120° C.). In the case of OPC-based formulations, there is no evidence of effectiveness of organic additives used for their modifications at high temperatures.

The world is moving to the green efficient energy recovery and high enthalpy geothermal wells present significant benefits for efficient and sustainable energy production. However, oil-field solutions for resolving issues common for geothermal wells cannot be used because of their temperature limitations.

Thermal Shock Resistant Cement (TSRC) consisting of calcium aluminate cement (CAC), fly ash type F (FAF), sodium metasilicate (SMS) as an alkali activator, and carbon microfiber reinforcement for improved bonding with the tubular body was developed to address the need of a thermal- and chemical-shocks resistant material for high-temperature geothermal wells. Although FAF particles are low weight, they do not allow TSRC density decrease below ~1.8SG, so other strategies are necessary for formulating light-weight slurries of TSRC. Additional efforts are also necessary for rendering to this composite thermally insulating properties for efficient energy recovery and storage.

Among the most challenging conditions for any cement to withstand is the frequent thermal shock encountered by cements in geothermal wells where there may be significant difference in temperatures of injected and produced fluids. Therefore, there is a need for a lightweight, insulating well cement with adequate mechanical properties that can withstand frequent thermal shocks and chemically aggressive environments while providing sufficient tubular body support and metal corrosion protection.

SUMMARY OF THE INVENTION

In accordance with the present invention, a well cement composite is provided that includes a mixture of cementitious material, preferably calcium aluminate cement (CAC), and fly ash cenospheres (CS) in a weight ratio of from 30:70 to 80:20 CAC to CS; sodium metasilicate (SMS) in an amount of from 1 to 10% of the total weight of the mixture of CAC and CS; polymethylhydrosiloxane (PMHS) in an amount of from 0.5 to 6.0% of the total weight of the mixture of CAC and CS; and water in a weight ratio of from 0.5:1.0 to 1.2:1.0 of water to CAC and CS.

The CAC and the CS is mixed in an alkaline environment having a pH greater than 9 and preferably having a pH range between 8 and 12.5. Preferably, the thermal conductivity of the well cement composite under water saturated conditions is less than 0.7 Watt per meter by Kelvin (W/mK) and the well cement composite has a density of about 1.28.

The present invention also includes a method of making a well cement composite including the steps of: mixing a siloxane with at least one hydrophobic functional group, preferably polymethylhydrosiloxane (PMHS), with an aqueous solution of sodium metasilicate (SMS) to form an emulsion; mixing fly ash cenospheres (CS) into the emulsion to release hydrogen gas and form a paste with the CS coated with polymethyl siloxane; adding calcium aluminate cement (CAC) and water to the paste and mixing to form the well cement composite, wherein the well cement composite comprises calcium aluminate cement (CAC) and fly ash cenospheres (CS) in a weight ratio of from 30:70 to 80:20 CAC to CS, sodium metasilicate (SMS) in an amount of from 1 to 10% of the total weight of CAC and CS, polymethylhydrosiloxane (PMHS) in an amount of from 0.5 to 6.0% of the total weight of CAC and CS, and water in a weight ratio of from 0.5:1.0 to 1.2:1.0 of water to CAC and CS.

Preferably, the cement composite and the method for making the cement composite have a CAC to CS weight ratio of about 60:40; SMS in an amount of about 6% by total weight of the CAC and CS; PMHS in an amount of about 3% by total weight of the CAC and CS; and a weight ratio of water to CAC and CS of about 0.8:1.0.

BRIEF DESCRIPTION OF THE FIGURES

The patent or application file contains at least one drawing executed in color. Copies of this patent or patent application publication with color drawing(s) will be provided by the Office upon request and payment of the necessary fee.

The preferred embodiments of the well cement composites of the present invention, as well as other objects, features and advantages of this invention, will be apparent from the accompanying drawings wherein.

DETAILED DESCRIPTION OF THE INVENTION

Figure 1:
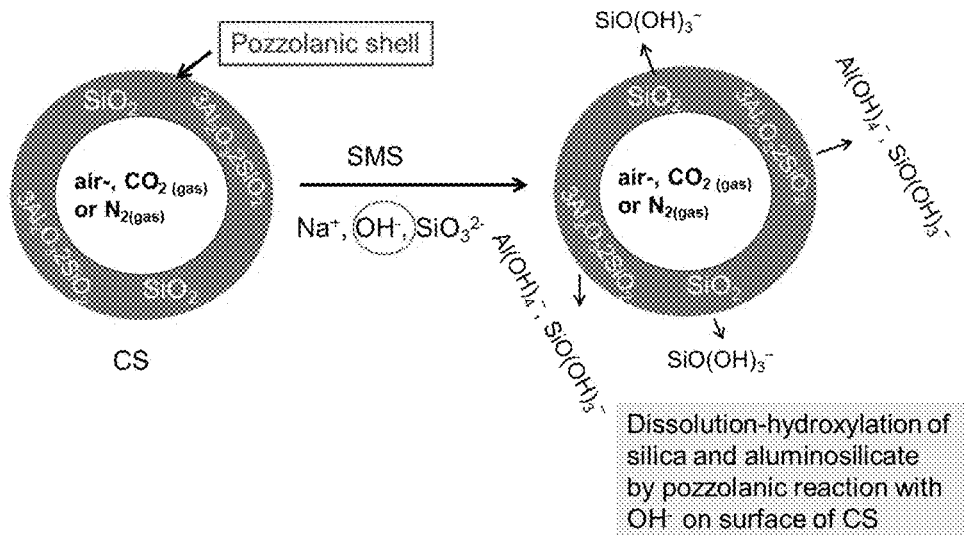
FIG. 1 is a schematic of SMS interactions with CS surfaces with formation of hydroxyls on the surface of the CS particles.

The lightweight cements of the present invention have five advanced properties compared with the conventional normal density and lightweight cements:

1. Great workability, leading to potential elimination of lost circulation problems;
2. Excellent thermal shock resistance responsible for extending cement service life-span;
3. Lower thermal conductivity attributed to improved thermal insulating properties under the water-saturated conditions;
4. High compressive toughness with good balance of strength and ductility, reflecting the resistance to initial crack development and the delay of crack propagation; and
5. Outstanding water repellency related to minimal water absorption and transportation rates.

As used herein, the term "cenospheres" refers to low density, fine particle size, hollow ceramic spheres that are used to reduce density and reduce thermal conductivity of cement. For the purposes of this disclosure, unless identified otherwise, the cenospheres are fly ash cenospheres and referred to as "CS".

The invention provides cementitious formulations, which, after the set under hydrothermal conditions, possess thermally insulating properties under water-saturated conditions applicable for geothermal wells. It also provides methods for the preparation of these formulations. The formulations are achieved by using a combination of a cementitious material and fly ash cenospheres (CS) with a water-repellant surface. The blend is water-mixable allowing preparation of slurries with rheological properties relevant for cementing subterranean wells. In addition to thermally insulating properties, after the set under the hydrothermal conditions, the blend develops desirable compressive strength and is thermal shock resistant. To obtain the water-repellant surface, the cenospheres are treated with a polysiloxane compound in an alkaline environment. The alkaline environment has a pH greater than 7, preferably a pH greater than 9, and most preferably a pH greater than 11. The preferred pH has a range between 8 and 12.5, and most preferably a pH range between 10 and 12. In the formulation most applicable for high-temperature geothermal wells, the blend is composed of calcium aluminate cement, and cenospheres with hydrophobic surfaces obtained by their pretreatment with polymethylhydrosiloxane (PMHS) in the presence of sodium metasilicate.

To maximize the thermally insulating nature of cement, as explained above, it must include high fractions of gas and a low fraction of free water and water cement hydrates in its structure. Lightweight cements have a high fraction of gas, which allows them to achieve low densities. The lightweight cements of the present invention have a density of between 1.1 and 1.4, preferably between 1.2 and 1.3 and most preferably about 1.28.

Among the lightweight particles used to prepare lightweight slurries, fly ash CS are known for their good compatibility with cement and low reactivity in cement environments under low temperatures. Like most FAF particles, the shell of the CS is mostly composed of aluminum-silicate that has low reactivity with cements at low temperatures, which allows them to keep gas inside (mix of nitrogen and $CO_2$) through the life of cements. However, at high temperatures, pozzolanic reactions occur, so the walls of cenospheres are damaged leading to increased slurry density and cement thermal conductivity.

Siloxanes with hydrophobic functional groups, in general, and PMHS in particular, may be used to make a substrate with hydroxyl functional groups at the surface that are water repellent. PMHS has the siloxane backbone chains, $(-Si-O-Si-O-)_n$ with two functional group attachments: a proton donor group Si—H and a hydrophobic Si—$CH_3$ group: $-[-Si(CH_3)_2-O-]_m-[HSi(CH_3)-O-]_n-$. Under alkaline environments, the Si—H group reacts with hydroxyl with the release of hydrogen: $2Si-H+2OH$-substrate→$2Si$—O-substrate+$2H_2$ (gas)↑. As a result, proton-depleted PMHS backbone chains cover the substrate through oxygen links with hydrophobic —$Si(CH_3)$ groups attached to them. The surface of the PMHS-treated substrate becomes hydrophobic. It was surprisingly discovered that treating CS with SMS and a siloxane with hydrophobic functional groups produces superhydrophobic cements from blends of PMHS-treated CS and cementitious materials. These superhydrophobic cements have significantly improved thermally insulating properties under water-saturated conditions while maintaining or improving their other important characteristics such as flowability related to slurries pumpability, stability, and timely development of adequate mechanical strength.

Figure 2:
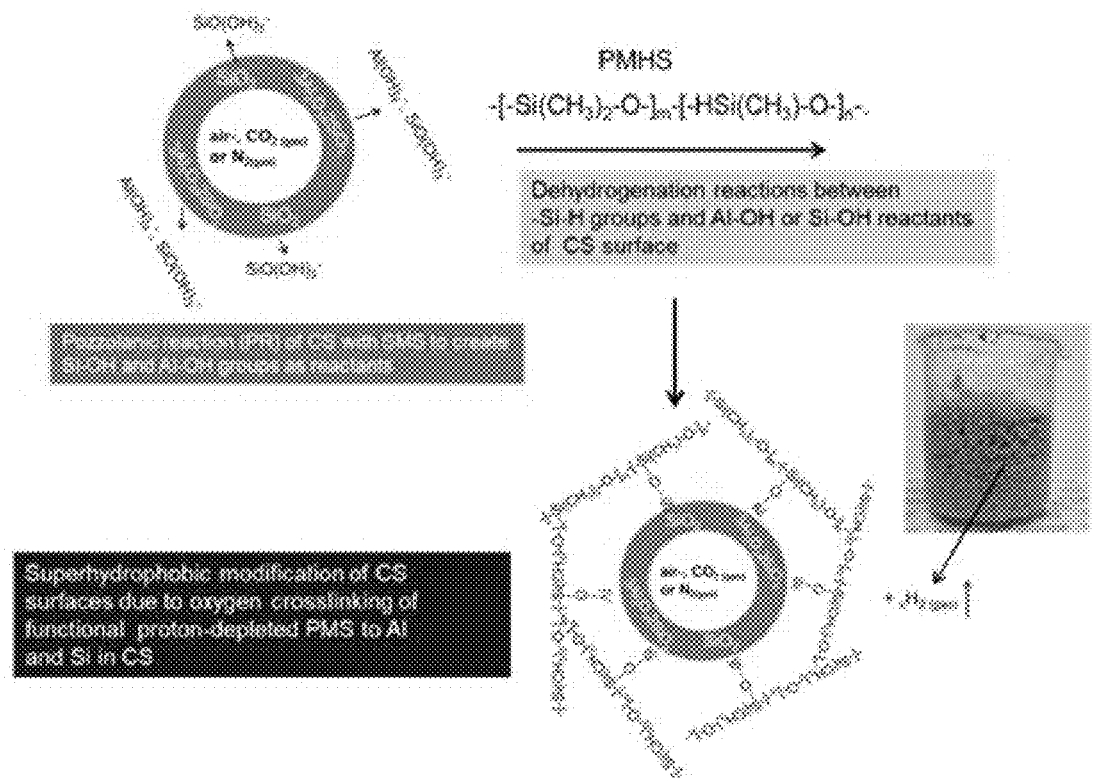
FIG. 2 is a schematic of SMS-pre-treated CS interactions with PMHS with hydrogen release.
Figure 3:
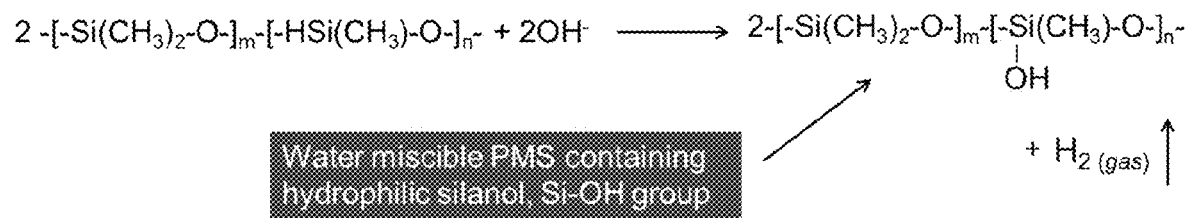
FIG. 3 is a schematic of alkali catalyzed dehydrogenation reaction between Si—H from PMHS and OH⁻ from SMS.
Figure 4:
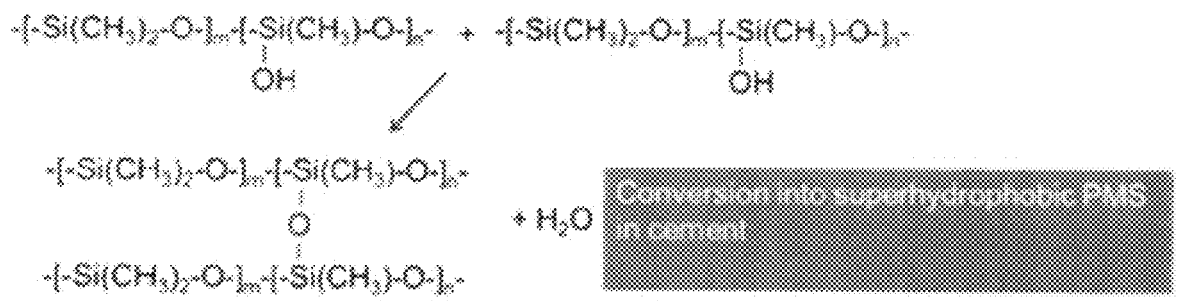
FIG. 4 is a schematic of condensation reactions between silanol groups at elevated hydrothermal temperatures.

The figures illustrate the process for preparing the thermally insulating superhydrophobic cement with PMHS, SMS, and CS. SMS ($Na_2SiO_3$) forms $Na^+$, $OH^-$, $SiO_3^{2-}$ ions in water. The pozzolanic reactions of aluminates and silica with hydroxyl from SMS result in formation of $Al(OH)_4^-$ and $SiO(OH)_3^-$ on the surface of the CS particles (FIG. 1). The hydroxyl groups at the surface of CS interact with PMHS with the release of hydrogen to form Al—O—Si and Si—O—Si linkages between CS and dehydrogenated PMHS: (CS)-R—OH+H—Si-(PMHS)→(CS)-R—O—Si-(PMS)+$H_2$↑, where R is Al and Si (FIG. 2). This leads to the entire surface of CS being coated with polymethyl siloxane that prevents further pozzolanic reactions of the particles when blended with cement and mixed with water. On the other hand, when PMHS is mixed with SMS the hydroxyl ions from SMS catalyze alkaline dehydrogenation of Si—H, incorporating silanol group into polymethyl siloxane; $2OH^-+2Si-H→2Si-OH+H_2$↑ (FIG. 3). Such polymethyl siloxane modified with silanol becomes hydrophilic with improved water miscibility. High hydrothermal temperatures of geothermal wells lead to condensation reactions of silanol groups on the surface of CS particles resulting in formation of superhydrophobic thermally insulating cement with excellent flowability (FIG. 4).

Figure 5:
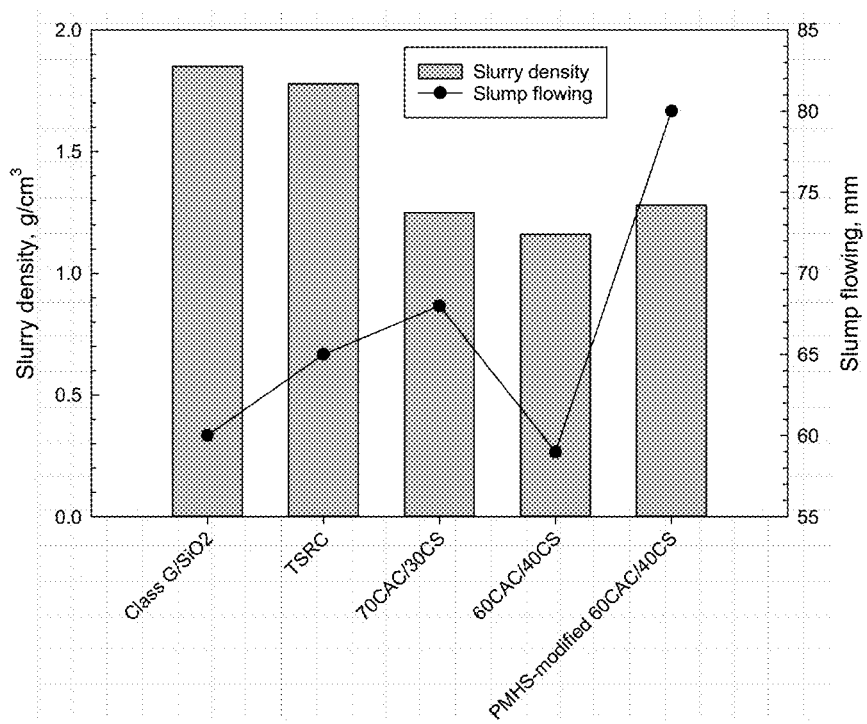
FIG. 5 is as graph that compares densities and flowability of slurries of Portland Cement/silica blend (Class G/SiO$_2$), Thermal Shock Resistant Cement (TSRC), lightweight cements prepared with CAC, and CS at different mass ratios, and CAC and PMHS-treated CS.
Figure 6:
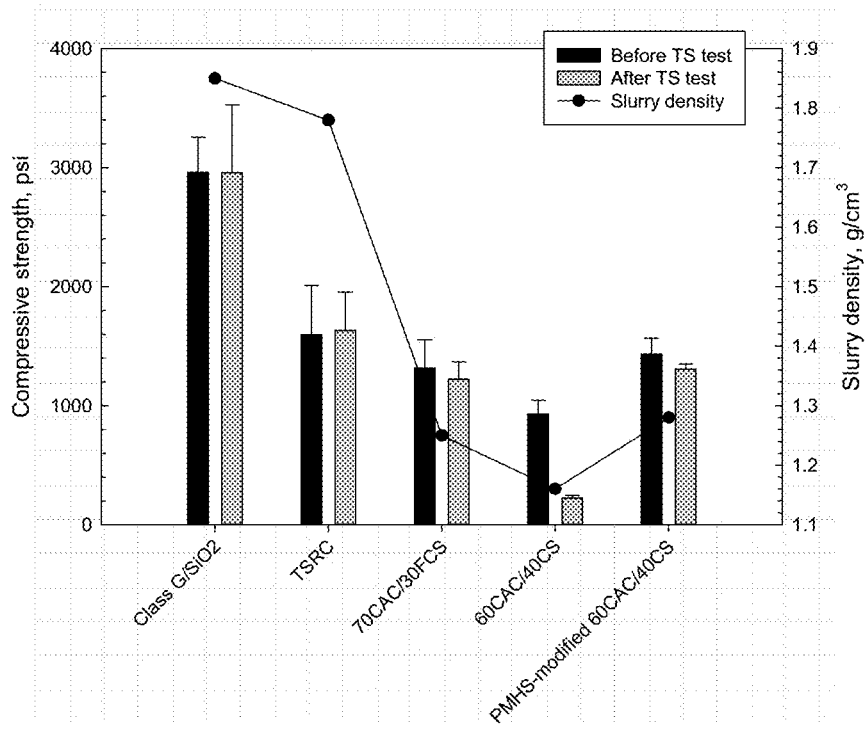
FIG. 6 is a graph that compares the compressive strengths of different cement formulations before and after 3 cycles of thermal shock. One cycle: 24 hours of 250° C. heat→15 minutes of cold-water emersion.
Figure 7:
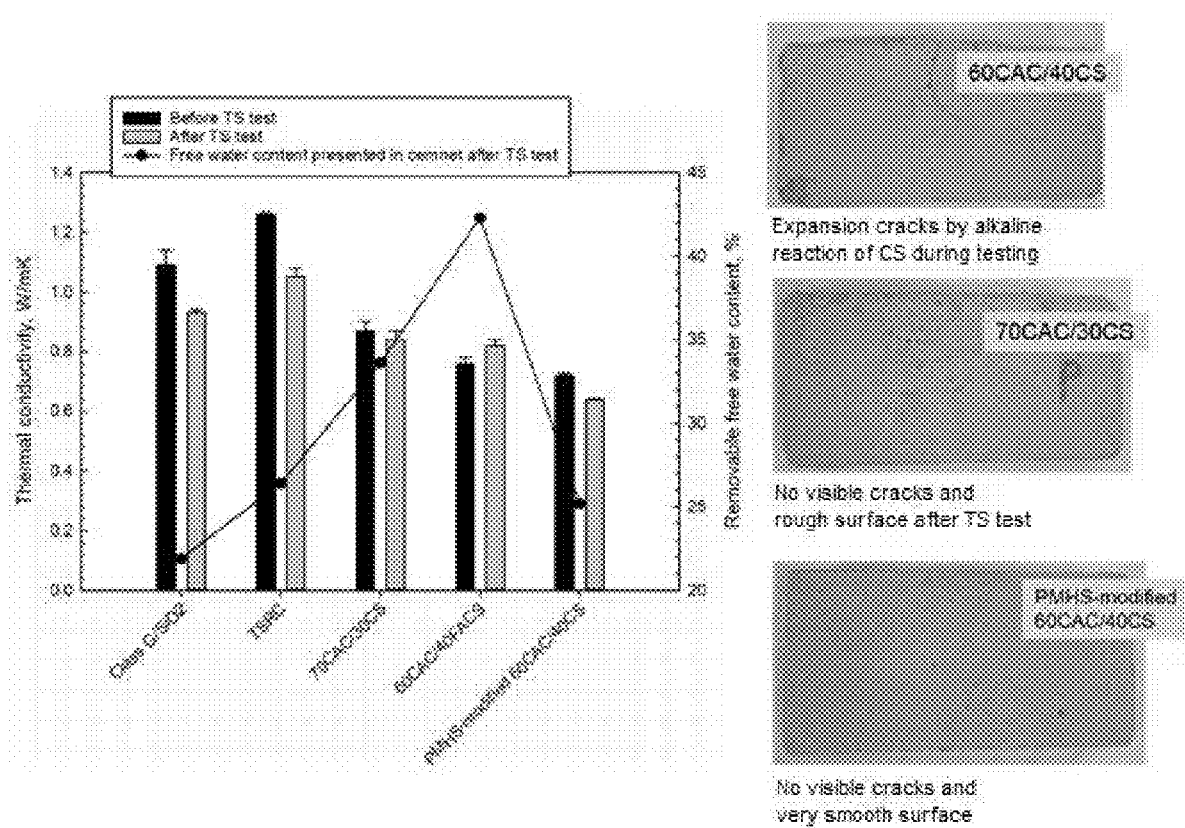
FIG. 7 is a graph and three photographs. The graph shows the thermal conductivity before and after 3 cycles of thermal shock tests measured under water-saturated conditions and removable water content after the thermal shock tests. The photographs show cement appearance after the thermal shock tests.

FIGS. 5-7 illustrate different features of the invention. FIG. 5 compares slurry density and flowability for OPC cement slurry (class G-$SiO_2$ blend) and slurries prepared with calcium-aluminate cement (TSRC and CAC blends with different mass ratios of CS), including a hydrophobic slurry prepared with the PMHS treated CS. In this example, the class G cement/$SiO_2$ blend was mixed at 70/30 weight ratio). The TSRC contained a blend of 60% CAC and 40% FAF, SMS was added at 6% by weight of the blend. The slurries with cenospheres that were not pre-treated with PMHS contained 5% by weight of CAC carboxylated acrylic polymer and 0.5% by weight of CAC nylon fibers for re-enforcement. The low-density slurry with PMHS-treated CS did not need a re-enforcement to reach the target compressive strength of >500 psi. The slurry was prepared in the following sequence. Firstly, PMHS emulsion in SMS solution was prepared by mixing polymer into SMS solution for 5 minutes by hand. Then CS were added to the emulsion and periodically mixed until the release of hydrogen was completed (in ~3 days). Finally, CAC was mixed into the slurry with CS at 1-to-2 CAC-to-slurry weight ratio. PMHS was added at 3% by weight of CAC and CS. SMS was added at 6% by weight of CAC. Note that slurry with PMHS-modified CS may be prepared in a different manner. For example, the CS may be pre-treated with SMS before mixing with PMHS and CAC through exposure of CS to SMS solution or SMS-CS slurry preparation from their dry blend. To accelerate CS surface pozzolanic reactions, the pretreatment of CS may be done at elevated temperature (e.g. 85° C.). Alternatively, SMS and PMHS-treated CS may be dried to form solid hydrophobic CS. Then a dry blend of hydrophobic CS and a cementitious material may be prepared. This blend will form hydrophobic cement when reacted water at high geothermal temperatures. The water to cement ratios were 0.44 for the class G/$SiO_2$ formulation, 0.52 for TSRC, and 0.8 for all formulations with the CS.

The data show that the slurry with PMHS treated CS has a low density and almost 30% better "slump" (i.e., flowability) than a similar slurry with non-treated CS. The flowability of the slurry with PMHS-treated CS is also noticeably improved in comparison with the rest of the tested slurries.

FIG. 6 is a graph that shows the compressive strengths of cements prepared from the above formulations by autoclaving them at 250° C. for 24 hours. The figure shows compressive strength before and after 3 thermal shock (TS) cycles (each cycle: 250° C. heat for 24 hours and 15-minute emergence in cold water at 20° C.). The TS cycling of cement formulated with PMHS-treated cenospheres does not change its strength significantly while the formulation with a similar (60/40) CAC/CS ratio develops cracks during the thermal shock testing.

FIG. 7 is a graph that shows thermal conductivities of cements under water-saturated conditions before and after three TS cycles and removable water content after the TS tests. The removable water content was determined by vacuum-drying the samples at 80° C. for 3 days. The figure also shows photographs of cements after the TS tests. (The cements were prepared as described above.) The photographs show that while 60/40 CAC/CS cement undergoes cracking, the same formulation with PMHS pre-treated CS does not develop any cracks in TS tests. Also, the formulation with PMHS-modified cenospheres reaches the lowest thermal conductivity measured under water-saturated conditions both before (0.72 W/mK) and after (0.64 W/mK) the thermal shock. Accordingly, this formulation had the lowest water content consistent with its water-repellant properties.

These examples illustrate excellent flowability of lightweight slurries formulated with PMHS treated cenospheres, good thermal shock resistance of the superhydrophobic lightweight cement, and its low thermal conductivity both before and after the thermal shock tests.

EXAMPLES

The examples set forth below serve to provide further appreciation of the invention but are not meant in any way to restrict the scope of the invention.

Materials

The well cement composites of the present invention were prepared using the following materials:

| Material | Source | Description | Amount (grams) |
|---|---|---|---|
| Calcium aluminate cement | CAC, Secar® 80, Kerneos Inc. | a cementitious material | 96 |
| Cenosphere ES500 | CS, CenoStar Inc. | hollow microspheres, as a thermal insulator | 64 |
| Sodium metasilicate | SMS, PPG Industries, Inc. | an alkali activator | 9.6 |
| Polymethylhydrosiloxane | PMHS, Sigma-Aldrich | a superhydrophobic initiator | 4.8 |
| Total water | | | 80 |

Preparation of Samples

The samples were prepared in the following sequence:

Step 1. Preparation of Superhydrophobic CS by Dehydrogenation Reactions Between —Si—H Group in PMHS and —OH Group on CS Surfaces.

1. To make SMS solution, 60 g water was added to 9.6 g of SMS, and then mixed by magnetic stirrer for 30 min to complete the dissolution of SMS.

2. 4.8 g PMHS was mixed with above SMS solution using magnetic stirrer for 60 minutes to prepare water miscible PMHS.

$$H_3C-\underset{\underset{CH_3}{|}}{\overset{\overset{CH_3}{|}}{Si}}-O\left[\underset{\underset{CH_3}{|}}{\overset{\overset{CH_3}{|}}{Si}}-O\right]_m\left[\underset{\underset{H}{|}}{\overset{\overset{CH_3}{|}}{Si}}-O\right]_n-O-\underset{\underset{CH_3}{|}}{\overset{\overset{CH_3}{|}}{Si}}-CH_3$$

| Hydrophobic Si—CH₃ groups | Functional proton donor Si—H groups |

PMHS structure $$2-[Si(CH_3)_2-O]_m-[HSi(CH_3)-O]_n + 2OH \longrightarrow$$

$$2-[Si(CH_3)_2-O]_m-[\underset{\underset{OH}{|}}{Si(CH_3)}-O]_n$$

$$+ H_{2\,(gas)} \uparrow$$

Water miscible PMS containing hydrophilic silanol, Si—OH group

Partially Hydrophilic Polymethylsiloxane (PMS) Formed by Dehydrogenation Reactions of —Si—H Group with Alkali OH⁻ Reactant Liberated from SMS 3. 64 g CS was added to PMHS/SMS solution and then mixed by hand for 3 minutes. This blend was repeatedly hand mixed with 2 hours intervals four times a day for 2 days to complete the dehydrogenation reactions and the elimination of H₂ gas.

The first reaction of CS with SMS to form CS's superhydrophobic surface is illustrated in FIG. 1. The secondary reaction of alkali-activated CS with PMHS to form CS's superhydrophobic surface is illustrated in FIG. 2.

Figure 8:
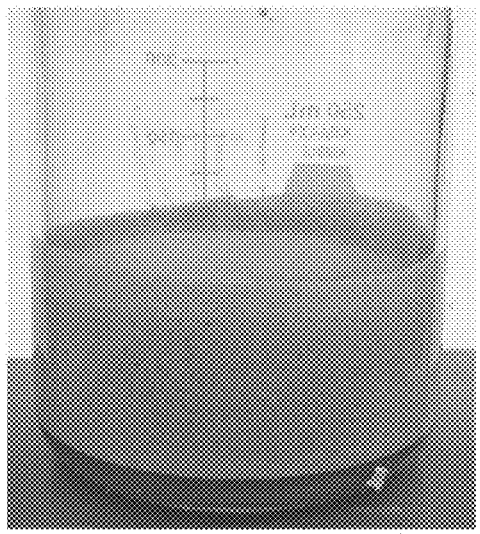
FIG. 8 is a photographic of a beaker containing PMHS-treated CS paste after the completion of dehydrogenation reactions and elimination of H$_2$ gas.

4. The product called PMHS-treated CS made in step 1 is a mixable paste. FIG. 8 shows the PMHS-treated CS paste after the completion of dehydrogenation reactions and elimination of H₂ gas.

Step 2. Preparation of Superhydrophobic CS-CAC 5. 20 g water was added to PMHS-treated CS paste, and then mixed by hand for 3 minutes to prepare CS slurry.

6. 96 g CAC was mixed with CS slurry for 3 minutes, and then left for 24 hours in atmospheric environment at 25° C. to convert CAC/CS slurry into solidified set cement hydrate.

7. This cement hydrate was exposed to steam environment at 85° C. for 24 hours to promote further cement hydration.

8. Afterward, final product was prepared by autoclaving steam-treated cement for 24 hours at temperatures, ranging from 100 to 300° C.

Preferred Ratio, Adequate Content, and General Range of Components in the Blend

CAC/CS weight ratio: 60/40 (general range from 30/70 to 80/20)

Content of SMS: 6% by total weight of CAC and CS (general range from 1 to 10%)

Content of PMHS: 3% by total weight of CAC and CS (general range from 0.5 to 6.0%)

Water/CAC weight ratio: 0.83 (general range from 0.5 to 1.2)

Physicochemical Properties of CS Used

Particle size distribution, microns:

| | |
|---|---|
| <500, | 99% (<3% over) |
| 150-499, | 10%-25% |
| 105-149, | 10%-30% |
| 75-104, | 18%-30% |
| 45-74, | 5%-20% |
| <44 | 2%-10% |

Shell composition, wt %:

| | |
|---|---|
| Silica | 50.0-60.0 |
| Alumina | 22.0-30.0 |
| Iron | 1.5-5.0 |

*Shell thickness against average diameter of CS

| Average diameter, μm | Shell thickness, μm |
|---|---|
| 225 | 12.7 |
| 183 | 10.6 |
| 143 | 8.0 |

-continued

| Average diameter, μm | Shell thickness, μm |
|---|---|
| 112 | 6.2 |
| 91 | 4.9 |
| 76 | 4.1 |
| 67 | 3.6 |
| 58 | 2.9 |
| 47 | 2.4 |

Characteristics of 250° C.-Autoclaved Super- or -Overhydrophobic Lightweight Cements To characterize the lightweight cement, 3% PMHS-modified 60CAC/40CS ratio cement containing 6% SMS was prepared with a water/CAC ratio of 0.83, followed by autoclaving for 24 hours at 250° C. For comparison, four reference cement samples were prepared. Among them, conventional well cement; 70% Class G cement/30% silica flour ($SiO_2$) denoted as Class G/$SiO_2$, and 60% CAC/40% fly ash F (FAF) containing 6% SMS called thermal shock resistant cement (TSRC). Two other references included 1) 70% CAC/30% CS lightweight cement modified with 0.5% nylon fiber reinforcement, 5% carboxylate acrylic polymer water-proofing, and 6% SMS marked as 70CAC/30CS; and 2) 60% CAC/40% CS lightweight cement modified with 0.5% nylon fiber reinforcement, 5% carboxylate acrylic polymer water-proofing, and 6% SMS marked as 60CAC/40CS. All reference cement samples were autoclaved for 24 hours at 250° C.

Five physical, thermal, and mechanical properties including density and slump, thermal shock (TS) resistance, thermal conductivity, compressive strength, and compressive toughness, were determined to characterize PMHS-modified 60CAC/40CS lightweight cement. TS resistance was evaluated from the changes in physical, thermal, and mechanical properties described above for cements after 3 cycles TS tests (one cycle: 250° C. heating for 24 hours followed by 25° C. water quenching).

Density and Workability of Cement Slurry

FIG. 5 comparers the density and slump values of reference and PMHS-modified 60CAC/40CS slurries made with water/cement ratios, ranging from 0.83 to 0.79. Two reference cement slurries of Class G/$SiO_2$ and TSRC had a common slurry density of around 1.8 g/cm$^3$. Compared with this, PMHS-modified (density ~1.28) and the other reference lightweight cement slurries had densities ranging from 1.16 to 1.28, reflecting ~36 and ~29% lower density. One typical characteristic of silicon oil-based PMHS-modified slurry is high workability due to its excellent lubricant property representing a very high slump of 80 mm, thereby making it possible to circulate readily the lightweight slurry under relatively low hydraulic pressure without any decrease in circulation properties.

Thermal Conductivity of Water-Saturated Cements Before and After TS Test

FIG. 7 shows the changes in thermal conductivity (TC) before and after TS test as well as free water content for water-saturated cements after TS. The rectangular prism samples (size: 60 mm width×120 mm length×20 mm thickness) were used in this TC tests. TC was determined using the Thermal Conductivity Measurement System. For the cements before TS, the reference samples, Class G/$SiO_2$ and TSRC, had 1.09 and 1.26 W/mK TC, respectively. A higher TC value of TSRC than that of Class G/$SiO_2$ is due to substantially higher content of $Al_2O_3$. As expected, the incorporation of CS with a low TC of 0.1-0.2 W/mK as thermal insulator into CAC/CS blend systems reduced TC value; namely, the substitution of 30 wt % CS having total weight of CAC in 70CAC/30CS sample resulted in 0.87 W/mK. The further substitution of 40 wt % CAC by CS (60CAC/40CS sample) led to TC reduction to 0.76 W/mK. The lowest TC of 0.72 W/mK, corresponding to nearly 43% and 34% lower than that of TSRC and Class G/$SiO_2$ references, respectively, was measured for PMHS-modified 60CAC/40CS cements, verifying that superhydrophobic PMHS offered an improved thermal insulating property of water-saturated cement. After the TS test, the reference lightweight sample containing a large amount of CS (60/CAC/40CS) generated the expansion cracks (FIG. 7). This observation suggested that the chemistry of CS's shell structure in cement is vulnerable to alkali pozzolanic reactions and becomes unstable during cyclic TS test. In contrast, the 60CAC/40CS samples with PMHS-treated CS remained intact; no visual cracks were observed, the surface was smooth. PMHS not only conferred the resistance to alkaline pozzolanic reactions of CS surfaces, but also demonstrated its hydrothermal stability at 250° C. All samples except for 60CAC/40CS reference revealed the decrease in TC value after TS tests, compared with that of the samples before TS. In fact, the Class G/$SiO_2$ and TSRC reference samples, respectively, reduced TC value to 0.93 from 1.09 W/mK and to 1.05 from 1.26 W/mK. For PMHS-modified sample, the reduced TC was 0.64 W/mK, highlighting improved insulation property after TS tests.

Because of the relatively high TC value of 0.6 W/mK for water, the free water content present in water-saturated cements governs the TC. Therefore, the free water content for samples after the TS tests was measured. The data showed that Class G/$SiO_2$ reference had the lowest free water content of 21.9%, followed by the PMHS-modified reference with a low water content of 25.2%. This implied that PMHS may provide two advanced properties for lightweight cement; one is the creation of dense microstructure and the other relates to the reduction of water transportation and absorption by its super-hydrophobicity. In contrast, the defected 60CAC/40CS lightweight reference cement included large free water of 42.3%, thereby resulting in increased TC value after TS.

Mechanical Properties Before and After TS Test

The mechanical properties were determined by Electromechanical Instron System. As shown in FIG. 6, the compressive strength depended primarily on slurry density; namely, high slurry densities resulted in stronger cements. For the samples prior to TS test, the highest compressive strength of 2960 psi was determined for Class G/$SiO_2$ reference with the density of 1.85 g/cm$^3$; whereas, the developed strength of 60CAC/40CS lightweight reference cement with the lowest density of 1.16 g/cm$^3$ was only 930 psi. After TS, there was no significant change in compressive strength for Class G/$SiO_2$ and TSRC references compared with that of before TS. A considerable decline of strength to 220 psi was observed for 60CAC/40CS lightweight reference cement due to the pozzolanic reactions of CS during cyclic TS. Two lightweight cements, 70CAC/30CS reference and PMHS-modified 60CAC/40CS, showed a slight reduction of strength.

Figure 9:
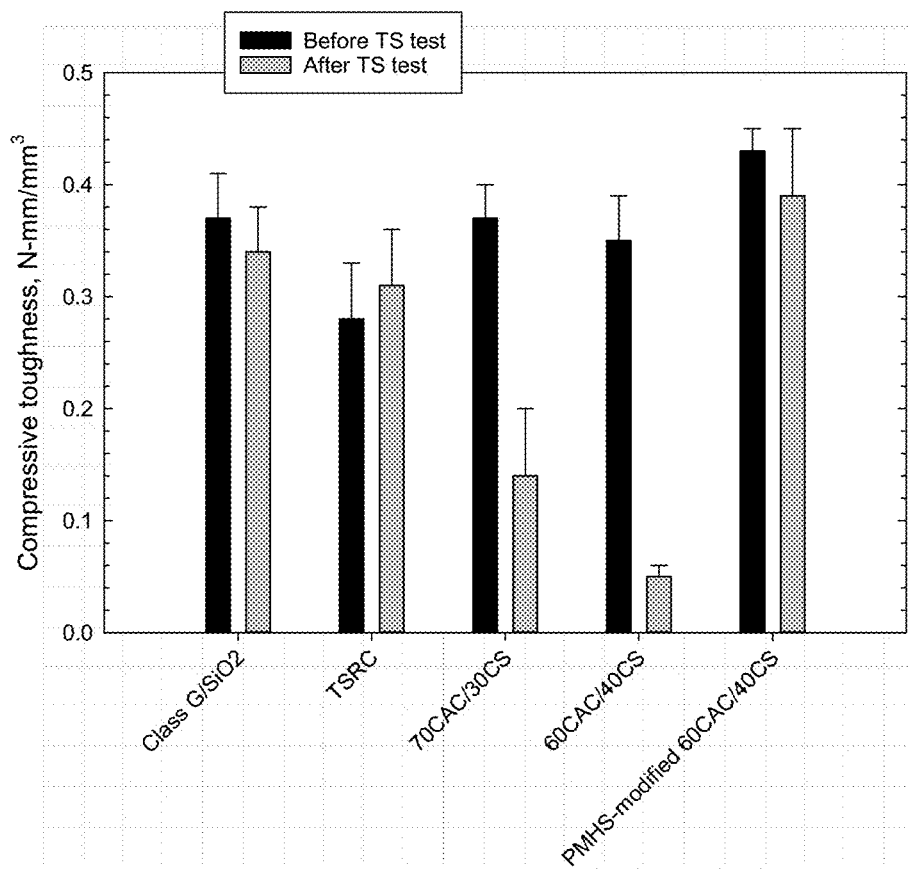
FIG. 9 is a graph showing the compressive toughness of different cement composites before and after TS.
Figure 10:
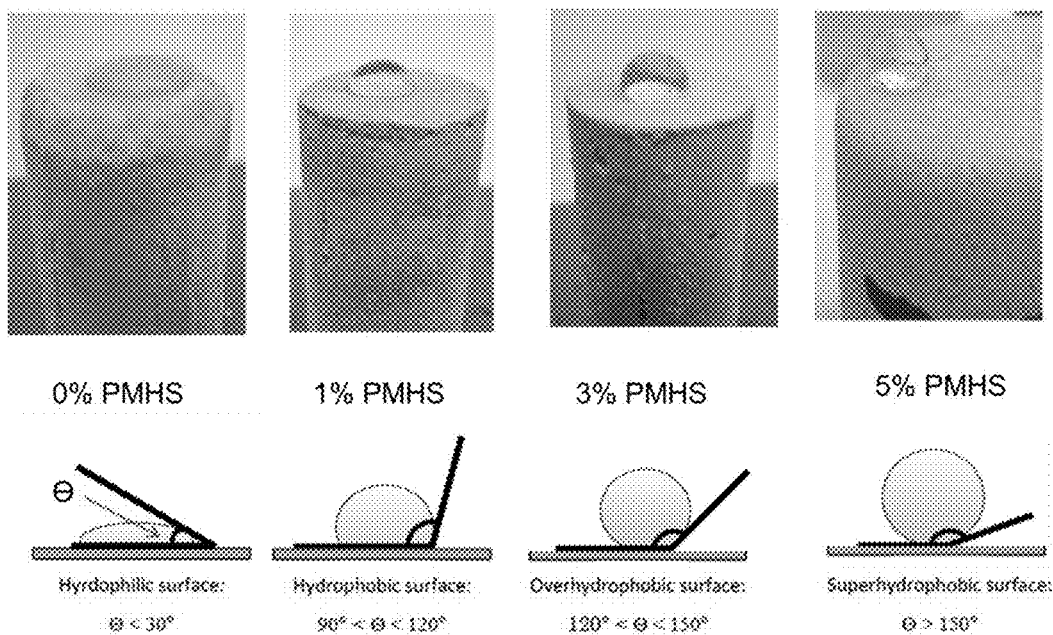
FIG. 10 includes four photographs showing the water repellant properties of 250° C.-autoclaved 60CAC/40CS low density cements with 0%, 1%, 3%, and 5% PMHS and the respective contact angles of water droplets on the surfaces of the cements.

FIG. 9 compares the changes in compressive toughness of these cements before and after TS. Before TS, as expected, both nylon fiber-reinforced lightweight reference cements, 70CAC/30CS and 60CAC/40CS, possessed an excellent compressive toughness of 0.37 and 0.35 N-mm/mm$^3$, respectively, which are equivalent to be 25% and 32% higher than that of TSRC reference and nearly equal to that of Class G/$SiO_2$. In contrast, PMHS-modified 60CAC/40CS cements without any fibrous reinforcing materials displayed the highest toughness of 0.43 N-mm/mm³. Since a high toughness is the result of a balance of strength and ductility, PMHS-treated CS appears to provide adequate mechanical balance in lightweight cement systems. After TS, all samples except TSRC reduced their toughness at different degrees. Nonetheless, PMHS-modified 60CAC/40CS still exhibited a good compressive toughness of nearly 0.4 N-mm/mm³.

Water-Repellent Property of Dried Cement Surfaces

The magnitude of the water repellent property of materials is commonly estimated from the range of contact angle θ of a water droplet over the surface of a dried material. Based on the value of the angle, the surfaces of materials are ranked as following: hydrophilic (0°<θ<90°)<hydrophobic (90°<θ)<overhydrophobic (120°<θ<150°)<superhydrophobic (150°<θ<180°) surfaces. Thus, a high contact angle reflects a better water-repellent property.

FIG. 12 depicts the changes in contact angle as a function of PMHS content for dried surfaces of PMHS-modified 60CAC/40CS lightweight cements made by autoclave of 24 hours at 250° C. The dry surfaces of water-saturated samples after autoclave were prepared by exposing them in an atmospheric environment at 25° C. for week. A Contact Angle Analyzer was used to measure the contact angle of the water droplets. The resulting data clearly demonstrated that the water-repellent properties can be controlled by changing the amount of PMHS; increasing the amount of PMHS improved the water-repellent properties, in fact, 5% PMHS-modified sample displayed superhydrophobicity.

Accordingly, this technology can be applicable for many different cementitious materials such as Ground Granulated Blast Furnace Slag (GBFS), Class C fly ash, Ordinary Portland Cement, and various calcium aluminate cements to produce superhydrophobic cements. Also, many different pozzolan-latent silica and aluminosilicate aggregates and fillers can be employed for their surface preparation by PMHS.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A well cement composite comprising:
    a mixture of calcium aluminate cement (CAC) and fly ash cenospheres (CS) in a weight ratio of from 30:70 to 80:20 CAC to CS;
    sodium metasilicate (SMS) in an amount of from 1 to 10% of the total weight of the mixture of CAC and CS;
    polymethylhydrosiloxane (PMHS) in an amount of from 0.5 to 6.0% of the total weight of the mixture of CAC and CS; and
    water in a weight ratio of from 0.5:1.0 to 1.2:1.0 of water to CAC and CS.

2. The well cement composite according to claim 1, wherein the CAC to CS weight ratio is about 60:40.

3. The well cement composite according to claim 1, wherein the amount of SMS is about 6% by total weight of the CAC and CS mixture.

4. The well cement composite according to claim 1, wherein the amount of PMHS is about 3% by total weight of the CAC and CS mixture.

5. The well cement composite according to claim 1, wherein the ratio of water to CAC and CS is about 0.8:1.0.

6. The well cement composite according to claim 1, wherein the CAC and the CS is mixed in an alkaline environment having a pH greater than 9.

7. The well cement composite according to claim 1, wherein the CAC and the CS is mixed in an alkaline environment having a pH range between 8 and 12.5.

8. The well cement composite according to claim 1, wherein the thermal conductivity of the well cement composite under water saturated conditions is less than 0.7 Watt per meter by Kelvin (W/mK).

9. The well cement composite according to claim 1, wherein the well cement composite has a density of about 1.28 g/cm³.

10. A well cement composite comprising:
    a mixture of calcium aluminate cement (CAC) and fly ash cenospheres (CS) in a weight ratio of from 30:70 to 80:20 CAC to CS;
    sodium metasilicate (SMS) in an amount of from 1 to 10% of the total weight of the mixture of CAC and CS;
    a siloxane with at least one hydrophobic functional group in an amount of from 0.5 to 6.0% of the total weight of the mixture of CAC and CS; and
    water in a weight ratio of from 0.5:1.0 to 1.2:1.0 of water to CAC and CS.

11. A method of making a well cement composite comprising:
    mixing polymethylhydrosiloxane (PMHS) with an aqueous solution of sodium metasilicate (SMS) to form an emulsion;
    mixing fly ash cenospheres (CS) into the emulsion to release hydrogen gas and form a paste;
    adding calcium aluminate cement (CAC) and water to the paste and mixing to form the well cement composite,
    wherein the well cement composite comprises calcium aluminate cement (CAC) and fly ash cenospheres (CS) in a weight ratio of from 30:70 to 80:20 CAC to CS, sodium metasilicate (SMS) in an amount of from 1 to 10% of the total weight of CAC and CS, polymethylhydrosiloxane (PMHS) in an amount of from 0.5 to 6.0% of the total weight of CAC and CS, and water in a weight ratio of from 0.5:1.0 to 1.2:1.0 of water to CAC and CS.

12. The method of making a well cement composite according to claim 11, wherein the CAC to CS weight ratio is about 60:40.

13. The method of making a well cement composite according to claim 11, wherein the amount of SMS is about 6% by total weight of the CAC and CS.

14. The method of making a well cement composite according to claim 11, wherein the amount of PMHS is about 3% by total weight of the CAC and CS.

15. The method of making a well cement composite according to claim 11, wherein the weight ratio of water to CAC and CS is about 0.8:1.0.

16. The method of making a well cement composite according to claim 11, wherein the well cement composite has a pH greater than 9.

17. The method of making a well cement composite according to claim 11, wherein the has a pH range between 8 and 12.5.

18. The method of making a well cement composite according to claim 11, wherein the thermal conductivity of the well cement composite under water saturated conditions is less than 0.7 Watt per meter by Kelvin (W/mK).

19. The method of making a well cement composite according to claim 11, wherein the well cement composite has a density of about 1.28.

20. The method of making a well cement composite according to claim 11, wherein the paste formed by mixing the CS and the emulsion comprises CS coated with polymethyl siloxane.

\* \* \* \* \*